May 14, 1929.   P. R. OLIVER   1,712,967
STARTING PANEL FOR ELECTRIC MOTORS
Filed Aug. 22, 1925    2 Sheets-Sheet 1
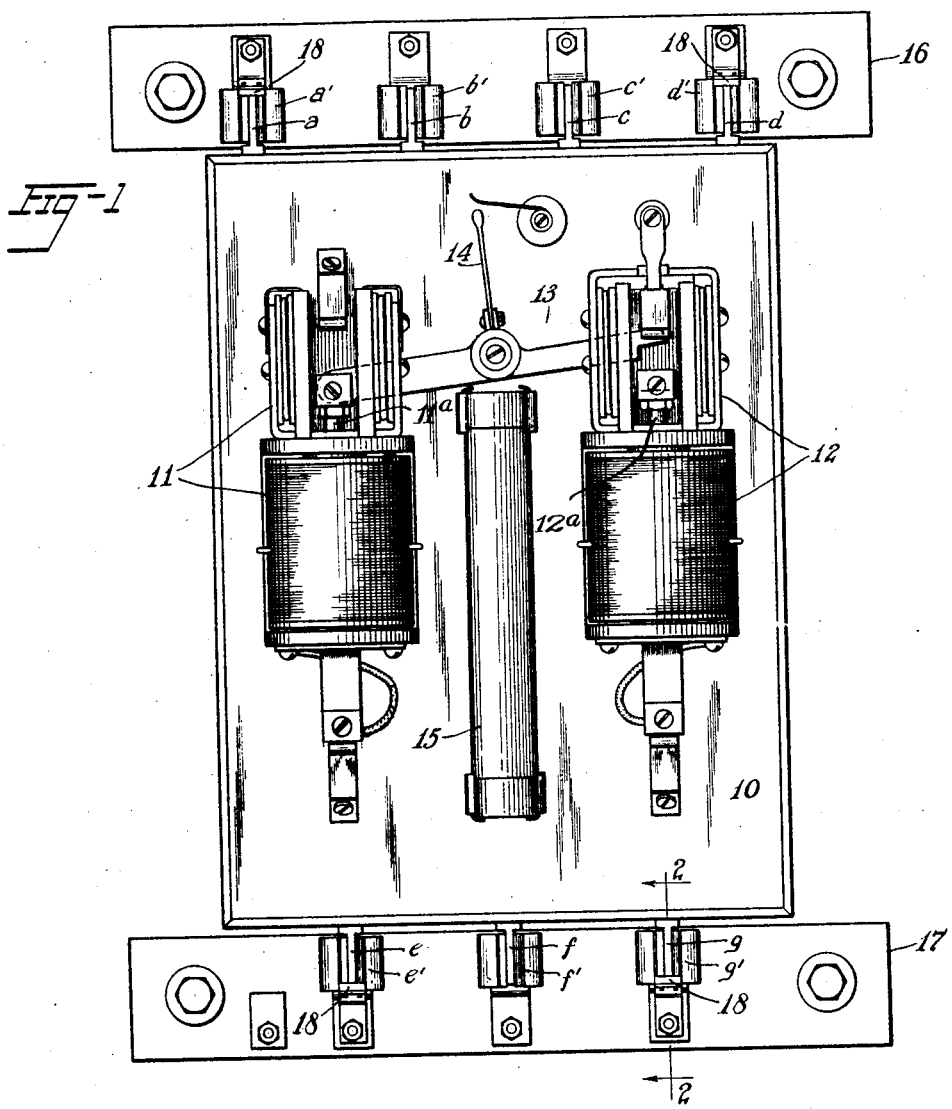
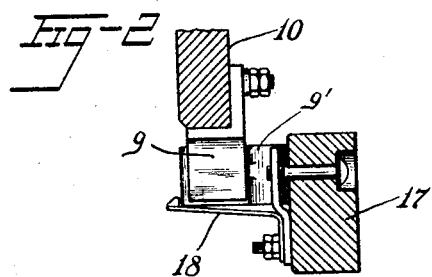
Inventor
Paul R. Oliver
By Pierson, Eakin & Avery
Attys.

May 14, 1929.  P. R. OLIVER  1,712,967
STARTING PANEL FOR ELECTRIC MOTORS
Filed Aug. 22, 1925  2 Sheets-Sheet 2
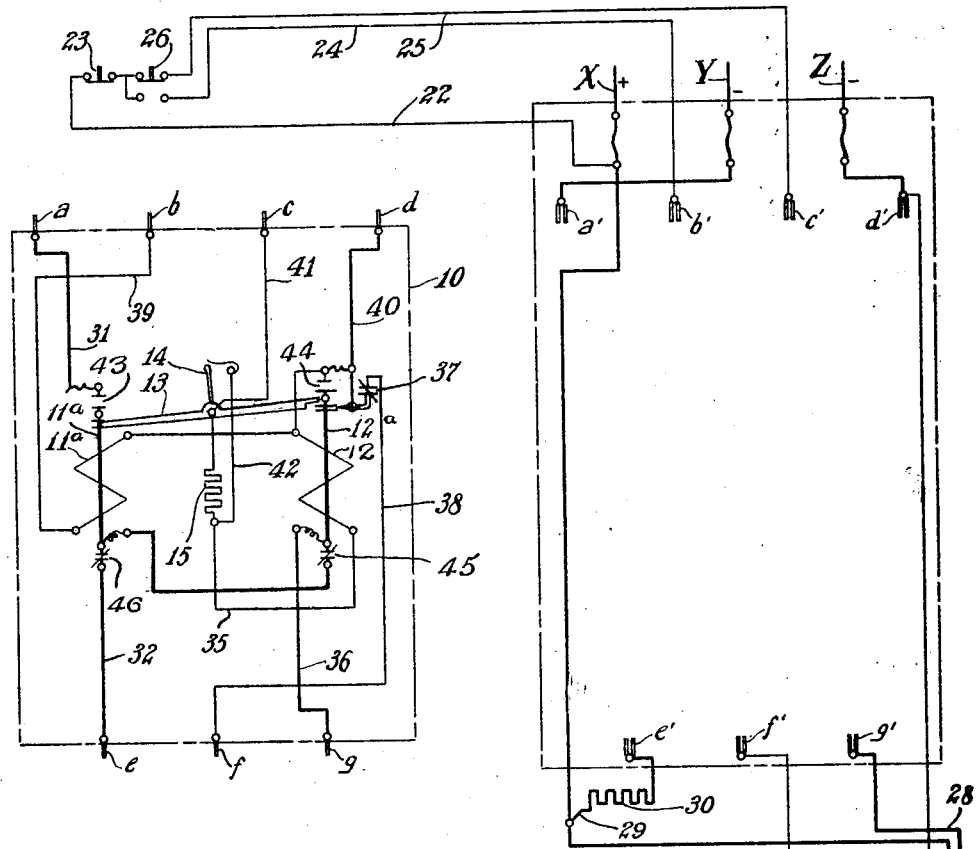
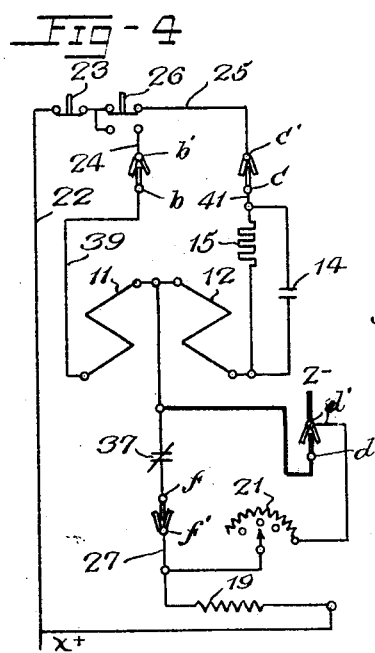
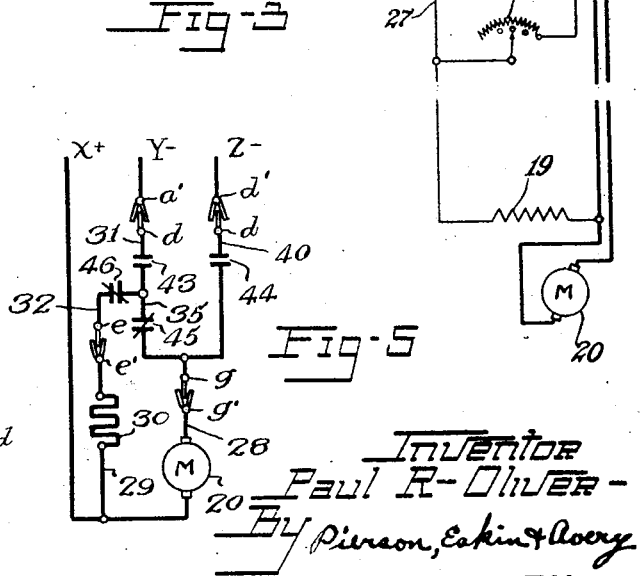
Inventor
Paul R. Oliver
By Pierson, Eakin & Avery
Attys.

Patented May 14, 1929.

1,712,967

UNITED STATES PATENT OFFICE.

PAUL R. OLIVER, OF AKRON, OHIO.

STARTING PANEL FOR ELECTRIC MOTORS.

Application filed August 22, 1925. Serial No. 51,805.

This invention relates to starting panels for electric motors, and its chief object is to provide a panel adapted for convenient repair. A more specific object is to provide a panel in which lightness and quick detachability may be combined, so that the panel may be conveniently removed from its mounting for repairs, and readily replaced after the repairs are made. A further object is to provide interchangeable panels adapted for quick substitution, in order to avoid the necessity of keeping the motor out of operation for long periods of time.

Starting panels for electric motors as heretofore used, so far as I am aware, either have been permanently mounted or have been so supported and so connected with the power lines that considerable labor has been involved in dismounting them for repair and as a consequence much time has been lost. Moreover, they have been comparatively heavy, their weight being to a considerable extent due to their inclusion of heavy starting resistances for permitting the starting of the motor without excessive shock from the feed lines which supply the motor at its high speed.

I find that by employing, for a direct current motor, three feed lines of different potential and using the voltage between the high positive and the intermediate line for starting, and then switching to the full voltage for high speed, thus eliminating the necessity for a starting resistance, a panel of such light weight may be used that it can be conveniently mounted and dismounted and the necessary electric connections to it concurrently made through knife switches having their mating parts mounted respectively upon the panel and upon its support.

Of the accompanying drawings:

Fig. 1 is an elevation of a starting panel and its mounting embodying my invention in its preferred form.

Fig. 2 is a section on line 2—2 of Fig. 1.

Fig. 3 is a diagram of the wiring of the panel and its mounting.

Fig. 4 is a diagram of the wiring of the control circuit, the parts being shown in de-energized position.

Fig. 5 is a diagram of the wiring of the line circuit, the parts being shown in deenergized position.

Referring to the drawings, 10 is the panel board, the principal devices mounted thereon being a pair of solenoids 11, 12, for operating the double-contactors $11^a$, $12^a$, a mechanical interlock 13 between the two contactors, an auxiliary contactor 14 mounted upon the mechanical interlock, and a holding-in and field-discharge resistance 15.

The panel is provided at its top edge with four projecting male knife-switch members or blades $a$, $b$, $c$, $d$, adapted to mate with female members or clips $a'$, $b'$, $c'$, $d'$, mounted upon a permanently fixed bracket 16. At its lower edge the panel is provided with three projecting switch knives $e$, $f$, $g$, mating with clips $e'$, $f'$, $g'$, mounted upon a permanently fixed bracket 17, the panel and all of the wiring thereon being adapted to be mounted upon and removed from the brackets 16, 17, by simply mating or unmating the knives with the clips by movement of the panel as a whole, without the necessity of making or breaking any other electric connections. Cam latches 18, 18, are provided for latching the panel in place.

Referring more particularly to the wiring diagram of Fig. 3, X, Y and Z are D. C. power lines, X being a high positive, Z a low negative, and Y being of intermediate potential. The line X is permanently connected to the field 19 and to the armature 20 of the motor, and the line Z is permanently connected to the negative side of the field through a rheostat 21, both independently of the panel 10. The intermediate line Y runs to the knife-switch $a$—$a'$, and the negative line Z connects with the knife-switch $d$—$d'$ as well as with the negative side of the field. The control circuit includes a wire 22 leading from the positive power line X through a stop switch 23 and then branching into wires 24, 25, which lead to knife switches $b$—$b'$ and $c$—$c'$ respectively, a button-type starting switch 26 being adapted normally to connect the wire 25 with the power line X, but momentarily to disconnect wire 25 and to connect the wire 24 with the power line X, for starting.

From the negative side of the field a wire 27, in parallel with the rheostat 21, runs to the knife-switch $f$—$f'$, and from the negative side the armature a wire 28 runs to the knife-switch $g$—$g'$. A wire 29, from the high positive power line X, leads through a dynamic resistance 30 to the knife-switch $e$—$e'$.

Referring to the wiring on the panel 10, the contactor $11^a$ having respective contacts 43 and 46 is adapted to connect alternatively the intermediate power line Y, (through a wire 31) or the high positive power line X (through a wire 32) with a wire 35, and the contactor 12ª has respective contacts 45, 44, adapted alternatively to connect the wire 35 or the negative power line Z with the negative side of the armature, through a wire 36. A switch 37, adapted to be held open only when the negative side of the armature is connected with the negative power line Z, is adapted at all other times to connect the negative side of the field, through a wire 38, in parallel with the rheostat, with the negative power line Z.

The wire 24 of the starting circuit connects through the knife-switch b—b' with a wire 39 on the panel 10, said wire 39 leading, through the coil 11, to the panel continuation 40 of the negative power line Z, and a branch therefrom leads through the coil 12 and on through the holding-in and field-discharge resistance 15 to a wire 41 which connects through the knife-switch c—c' with the wire 25 of the control circuit. The auxiliary contractor 14 is adapted to establish a shunt past the resistance 15, through a wire 42, to the wire 41, whenever the intermediate power line Y is connected, through the wire 31, contactor 11ª, and wires 35, and 36, with the negative side of the armature.

In starting the motor by means of the devices here shown, the power line switches (not shown) being closed, and the switches 23 and 26 being in their normal positions with the control circuit broken in the wire 24, the operator presses the button switch 26 and thereby closes a circuit from the positive power line X, through the wires 22, 24, 39 and the coil 11, to the panel continuation 40 of the negative power line Z, while the circuit through the coil 12 and the resistance 15 is open at the switch 26 in the wire 25.

The contactor 11ª is thus caused to close a circuit from the intermediate power line Y, through wires 31, contact 43, 35, 36, and 28 to the negative side of the armature, starting the motor on the voltage of power lines X and Y, the negative side of the field being connected to the negative power line Z through wires 27, 38 and 40. This closing movement of the contactor 11ª actuates the auxiliary contactor 14 to put the wire 42 in parallel with the resistance 15.

When the motor has gained the full speed of the voltage of X and Y the operator releases the button switch 26, which breaks the control circuit through the contactor 11ª and closes a control circuit from the positive line X, through the wires 22, 25, 41, 42, and the coil 12, to the panel continuation 40 of the negative line Z, which causes the starting power circuit just described to be broken at the contact 43 of the contactor 11ª and, while the auxiliary contactor 14 is closed to permit a strong current through the wire 42, actuates the contactor 12ª to close a power circuit from the negative power line Z, through wire 40, contact 44 of contactor 12ª, and wires 36 and 28, to the negative side of the armature, and applies the full voltage of X and Z to the motor. This movement of the contactor 12ª opens the switch 37 and thus leaves the negative side of the field connected with the negative line Z only through the rheostat 21, which may then be employed to control the speed of the motor.

As the auxiliary contactor 14 disengages, upon the opening of the starting circuit and the closing of the high voltage circuit, the resistance 15 is interposed in the control circuit and permits only sufficient flow therethrough to hold the contactor 12ª in its uppermost position, to which it was raised while the resistance was cut out.

In stopping the motor the control circuit is broken by momentarily opening the stop-switch 23, whereupon the contactor 12ª drops, breaking the power circuit and permitting the switch 37 to close for the next starting.

The closing of the lower contact 45 of the contactor 12ª completes a dynamic-braking circuit from the negative side of the armature, through wires 28, 36, contact 45, 35, contact 46, and 32, and the dynamic resistance 30, to the positive side of the armature, and thus by throwing a heavy load upon the motor, now acting as a dynamo, promptly brings it to a stop.

Upon the opening of the power circuit from any cause, such as the opening of the line switch or the burning of a fuse after the motor has been normally stopped by the push button 23, the holding-in resistance 15, being in circuit, acts as a field-discharge resistance.

The starting device, being of simple construction, may be of such light weight as to permit the convenient use of the quick-detachable panel, and the latter with the parts carried thereby may be conveniently handled and substituted by a similar panel for purposes of repair. Further advantages are that simplified wiring and full dynamic braking are conveniently provided. My invention is susceptible of modification within its scope and I do not wholly limit my claims to the specific form of it which is here shown.

I claim:

1. The combination with a plurality of power circuits of different voltages of a motor, a starting switch device therefor comprising means for supplying current to the motor successively from each of the said power circuits, and a quick-detachable panel constituting a mounting for the principal wiring of said device and having quick-detachable switch members for connecting the wiring on said panel with the power lines and with the motor lines.

2. In combination with a motor, a motor starting-switch device comprising a control circuit, a contactor having a solenoid coil associated therewith and a holding-in resistance therefor in said control circuit, and means for establishing a field-discharge circuit through said resistance and solenoid coil in series.

3. The combination with a plurality of power circuits of different voltages of a motor, a starting switch device therefor comprising means for supplying current to the motor successively from each of the said power circuits, a quick-detachable panel constituting a mounting for the principal wiring of the said device, a supporting structure for said panel, members on the panel engaging members on the said supporting structure and adapted to permit the panel to be quickly secured upon and detached from the supporting structure and to establish circuits which include the panel wiring, the respective power lines, and the motor lines, while so secured upon the said structure.

4. In combination with a motor and power circuits respectively of relatively low voltage and relatively high voltage, a motor starting-switch device comprising two double contactors, connectors whereby one of the double contactors is adapted by one of its contacts to connect the motor to the power circuit of relatively low voltage, connectors whereby the other double contactor is adapted by one of its contacts to connect the motor to the power circuit of relatively high voltage, connectors whereby the two double contactors together, by their other contacts, are adapted to establish a dynamic braking circuit, and a single means for connecting the motor in succession to each of the said power circuits.

5. In combination with a motor and power circuits respectively of relatively low voltage and relatively high voltage, a motor starting switch device comprising two double contactors, connectors whereby one of the double contactors is adapted by one of its contacts to connect the motor to the power circuit of relatively low voltage for applying a starting voltage to the motor, connectors whereby the other double contactor is adapted by one of its contacts to connect the motor to the power circuit of relatively high voltage, connectors whereby the two double contactors together, by their other contacts, are adapted to establish a dynamic braking circuit, a holding-in resistance for one of said contactors, and means for establishing a field discharge through said resistance.

In witness whereof I have hereunto set my hand this 18th day of August, 1925.

PAUL R. OLIVER.